United States Patent
Uehara et al.

(10) Patent No.: US 7,308,677 B2
(45) Date of Patent: Dec. 11, 2007

(54) PROGRAM GENERATING APPARATUS, PROGRAM GENERATING METHOD AND PROGRAM GENERATOR

(75) Inventors: Tadahiro Uehara, Kawasaki (JP); Kouji Yamamoto, Kawasaki (JP); Rieko Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 603 days.

(21) Appl. No.: 10/355,283

(22) Filed: Jan. 31, 2003

(65) Prior Publication Data
US 2003/0212956 A1    Nov. 13, 2003

(30) Foreign Application Priority Data
May 10, 2002  (JP)  ............................. 2002-135950

(51) Int. Cl.
*G06F 9/44*  (2006.01)
(52) U.S. Cl. ................. 717/108; 717/106; 717/114; 717/116; 717/162
(58) Field of Classification Search ........ 717/110–178, 717/108, 106; 707/4
See application file for complete search history.

(56) References Cited

U.S. PATENT DOCUMENTS

| | | | | |
|---|---|---|---|---|
| 5,734,907 | A * | 3/1998 | Jarossay et al. | 717/141 |
| 6,901,588 | B1 * | 5/2005 | Krapf et al. | 717/164 |
| 2002/0184610 | A1 * | 12/2002 | Chong et al. | 717/109 |
| 2002/0198876 | A1 * | 12/2002 | Zielinski et al. | 707/4 |
| 2004/0181780 | A1 * | 9/2004 | Shiu | 717/121 |
| 2005/0015732 | A1 * | 1/2005 | Vedula et al. | 715/805 |
| 2005/0183061 | A1 * | 8/2005 | Pananikolaou et al. | 717/103 |
| 2005/0229154 | A1 * | 10/2005 | Hiew et al. | 717/110 |
| 2006/0031833 | A1 * | 2/2006 | Huang et al. | 717/178 |
| 2006/0095568 | A1 * | 5/2006 | Makagon et al. | 709/224 |
| 2007/0067760 | A1 * | 3/2007 | Andrew et al. | 717/143 |

FOREIGN PATENT DOCUMENTS

| | | |
|---|---|---|
| JP | 05-233239 | 9/1993 |
| JP | 10/097417 | 4/1998 |
| JP | 2001-236214 | 8/2001 |

OTHER PUBLICATIONS

Office Action mailed Nov. 28, 2006 in corresponding Japanese patent application No. 2002-135950.

* cited by examiner

*Primary Examiner*—Meng-Al T. An
*Assistant Examiner*—Mark P. Francis
(74) *Attorney, Agent, or Firm*—Staas & Halsey LLP

(57) ABSTRACT

Program generating method and apparatus and generator program ensure high functional consistency, performance and program development efficiency by allowing program structuring components and linking constraints to be selectively determined on the basis of processing contents and performance requirements. The apparatus includes an XML (eXtensible Markup Language) processing scheme selecting unit (11) for inputting a desired processing scheme, a component providing unit (12) for acquiring from a predetermined storage (16) the information concerning utilizable structural components for generating a predetermined program on the basis of the inputted processing scheme, a control information definition unit (13) for displaying all or a part of the acquired information and inputting the information concerning the components for generating a predetermined program on the basis of the displayed information, and a program generating means (14) for generating the predetermined program on the basis of the inputted information concerning the components.

19 Claims, 15 Drawing Sheets

Fig.10

```
public void execute(Map processedDataMap){
    //processedDataMap is map storing input/output XML of components
    int state =BEGIN;
    while(state != END){
        state = stateMachine(state,processedDataMap);
    }
} private int stateMachine(int state, Map processedDataMap){
    switch(state){   //control component fetch sequence
    case BEGIN:
        return CALL_DATACHECK;
    case CALL_DATACHECK:
        call_datacheck_component(processedDataMap);
        // begin code preservation CALL_DATACHECK
        //end code preservation
        return CALL_GETNUMBER;
    case CALL_GETNUMBER:
        call_getnumber_component(processedDataMap);
        // begin code preservation CALL_GETNUMBER
        //end code preservation
        return CALL_STORERDB;
    case CALL_STORERDB:
        call_storerdb_component(processedDataMap);
        // begin code preservation CALL_STORERDB
        //end code preservation
        return END;
    case END:
        return END;
    default:
        return END;
    }
} private void call_datacheck_component(Map processedDataMap){
    Document doc = (Document) processedDataMap.get("inputXML");
    Document result = datacheck_component.check(doc);
    processedDataMap.put("XML1",result);
}
...
```

A2 → case CALL_DATACHECK:
A3 → case CALL_GETNUMBER:
A4 → case CALL_STORERDB:

Fig.16(a)

```
XML SLIP APPLICATION TYPE PROCESSING SCHEME
[UTILIZABLE COMPONENTS]
    A1: XML signature verifying component
    A2: DOM-destined XML data checking component
    B2: SAX-destined XML data checking component
    A3: Numbering component
    A4: DOM-dedicated RDB storing component
    C4: Stream-dedicated RDB storing component
[LINKING CONSTRAINTS]
    Process in one of the orders mentioned below.
        (A1)-(A2)-A3-A4
        (A1)-(B2)-A3-C4
        A3-(A1)-(A2)-A4
        A3-(A1)-(B2)-C4
    ※ Parenthesized components can be omitted.
```

Fig.16(b)

```
DOM TYPE PROCESSING SCHEME
[UTILIZABLE COMPONENTS]
    A1: XML signature verifying component
    A2: DOM-destined XML data checking component
    A3: Numbering component
    A4: DOM-dedicated RDB storing component
    A5: DOM-destined XML data dividing component
    A6: DOM-destined XML data combining component
    ...
[LINKING CONSTRAINTS]
    XML data transfer among components is effected through DOM.
```

Fig.19

```
public void execute(Map processedDataMap){
    //processedDataMap is map storing input/output XML of components
    int state =BEGIN;
    while(state != END){
        state = stateMachine(state,processedDataMap);
    }
} private int stateMachine(int state, Map processedDataMap){
    switch(state){   //control component fetch sequence
    case BEGIN:
        return CALL_DATACHECK;
    case CALL_DATACHECK:                                              ← A2
        call_datacheck_component(processedDataMap);
        // begin code preservation CALL_DATACHECK
        // end code preservation
        return CALL_GETNUMBER;
    case CALL_GETNUMBER:                                              ← A3
        call_getnumber_component(processedDataMap);

// begin code preservation CALL_GETNUMBER
        // add this portion by developer
        if (processedDataMap.get("XML2") == null){                    ← B
            processedDataMap.put("XML2","9999999")
        }
        //end code preservation return CALL_STORERDB;
    case CALL_STORERDB:                                               ← A4
        call_storerdb_component(processedDataMap);
        // begin code preservation CALL_STORERDB
        //end code preservation
        return END;
    case END:
        return END;
    default:
        return END;
    }
} private void call_datacheck_component(Map processedDataMap){
    Document doc = (Document) processedDataMap.get("inputXML");
    Document result = datacheck_component.check(doc);
    processedDataMap.put("XML1",result);
}
...
```

Fig.21

```
public void execute(Map processedDataMap){
    //processedDataMap is map storing input/output XML of components
    int state =BEGIN;
    while(state != END){
        state = stateMachine(state,processedDataMap);
    }
} private int stateMachine(int state, Map processedDataMap){
    switch(state){   //control component fetch sequence
    case BEGIN:
        return CALL_VERIFYXML;
    case CALL_VERIFYXML:
        call_verifyxml_component(processedDataMap);
        // begin code preservation CALL_VERIFYXML
        //end code preservation
        return CALL_DATACHECK;
    case CALL_DATACHECK:
        call_datacheck_component(processedDataMap);
        // begin code preservation CALL_DATACHECK
        //end code preservation
        return CALL_GETNUMBER;
    case CALL_GETNUMBER:
        call_getnumber_component(processedDataMap);
        // begin code preservation CALL_GETNUMBER
        // add this portion by developer
        if (processedDataMap.get("XML2") == null){
            processedDataMap.put("XML2","9999999")
        }
        //end code preservation
        return CALL_STORERDB;
    case CALL_STORERDB:
        call_storerdb_component(processedDataMap);
        // begin code preservation CALL_STORERDB
        //end code preservation
        return END;
    case END:
        return END;
    default:
        return END;
    }
} private void call_verifyxml_component(Map processedDataMap){
    Document doc = (Document) processedDataMap.get("inputXML");
    verifyxml_component.verify(doc);
} private void call_datacheck_component(Map processedDataMap){
    Document doc = (Document) processedDataMap.get("inputXML");
    Document result = datacheck_component.check(doc);
    processedDataMap.put("XML1",result);
}
...
```

- A1: case CALL_VERIFYXML block — NEWLY ADDED SOURCE CODES
- A2: case CALL_DATACHECK
- A3: case CALL_GETNUMBER
- B: developer-added code — CODE ADDED BY DEVELOPER IS ALSO PROTECTED
- A4: case CALL_STORERDB
- A1-a: call_verifyxml_component definition

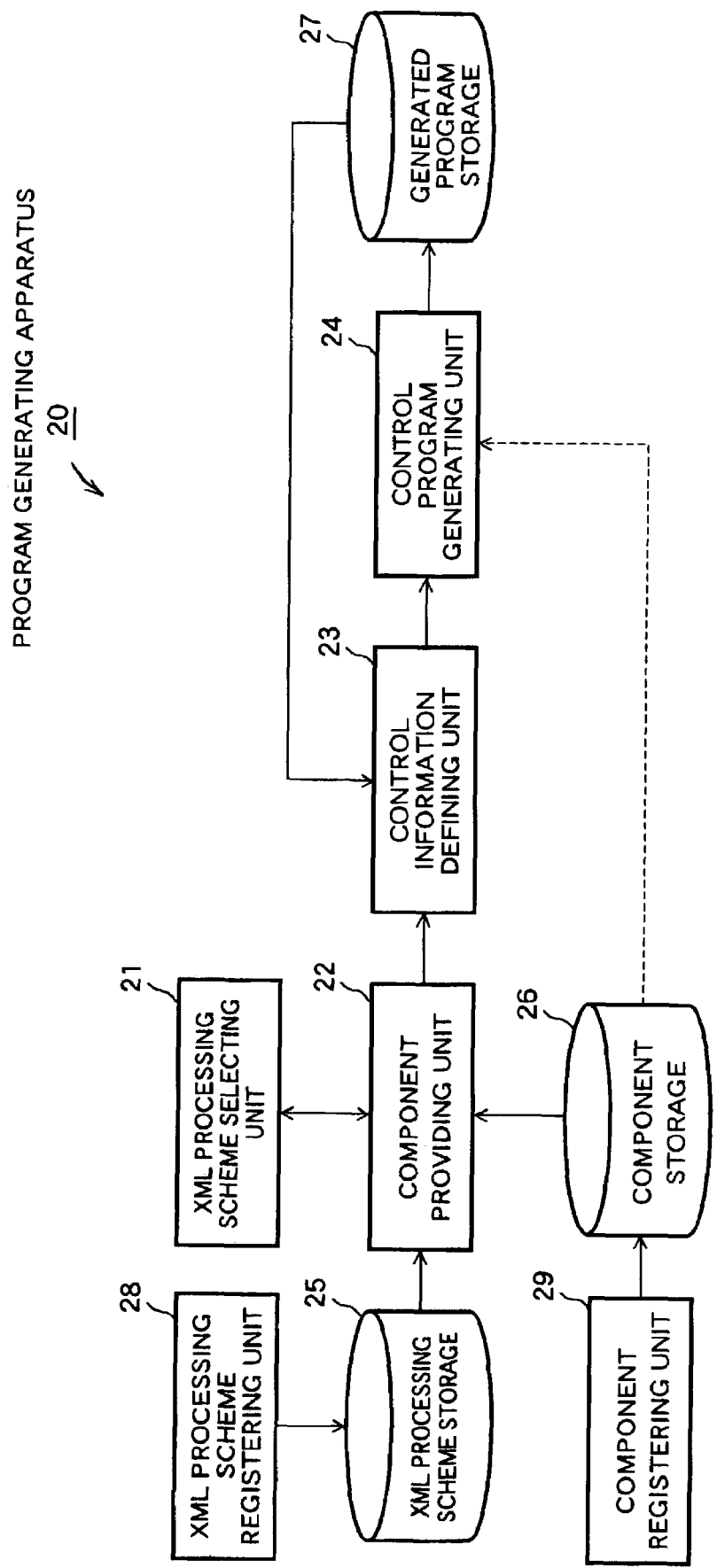

PROGRAM GENERATING APPARATUS, PROGRAM GENERATING METHOD AND PROGRAM GENERATOR

BACKGROUND OF THE INVENTION

1. Field of the Invention

The present invention relates to a program generating apparatus, a program generating method and a program generating program (also known as program generator or simply as generator) for generating a program by combining, linking or concatenating structural components of the program in a desired form.

2. Description of Related Art

In the technical field of development of program, there are known numerous and various techniques for enhancing the efficiency of program development by firstly preparing in advance program parts (also referred to as the structural components, structural parts or simply as the components) and by combining the program parts or components in a desired form. Thus, as the environment for the development of program, there can be conceived the environment for aiding or supporting the development of the structural components themselves on one hand and the environment for structurizing the program by combining the structural components. In the environment of the program development for structurizing the program, there is generally adopted a procedure of generating a program by concatenating or linking the components designated by a developer or operator in the manner also designated by the developer.

In this conjunction, it is noted that a technique of automatically selecting the components to be made use of in the program structurization is disclosed in Japanese Patent Application Laid-Open Publication No. 233239/1993 (JP-A-5-233239). According to the procedure taught in this publication, a program can automatically be structured or structurized by optimally selecting linking relations (which may also be referred to as the concatenating relations) between or among the given components. Thus, the program can easily be created or generated even by those who are rather poor in the knowledge concerning the program development technology.

It is however noted that with the environments for the program development known heretofore, it is impossible to aid or support the developer in his or her efforts to realize a program of desired specifications with a proper or appropriate structure by concatenating or linking the pertinent structural parts or components. Further, even in the environment for the program development described in Japanese Patent Application Laid-Open Publication No. 233239/1993, the number of programs which can be generated with different or various types is limited because the linking relations among the individual components are definitely given in advance. Such being the circumstances, there arise problems that functional consistency can not be sustained in the generated programs, performance thereof undergoes degradation and so forth.

SUMMARY OF THE INVENTION

In the light of the state of the art described above, it is an object of the present invention to provide a program generating method which is capable of evading the functional inconsistency and the performance deterioration while ensuring enhanced program development efficiency by selecting the components and determining the linking constraints (i.e., constraints imposed upon linking of the components) on the basis of the contents of processing and performance requirements as imposed upon structurization of a program.

It is anther object of the present invention to provide a program generating apparatus for carrying out the program generating method mentioned above.

Further, it is also an object of the present invention to provide a program generating program (also referred to as the program generator) which enables the above-mentioned program generating method to be carried out with the aid of a computer.

In view of the above and other objects which will become apparent as the description proceeds, there is provided according to a general aspect of the present invention a program generating apparatus which includes a first input means for inputting a desired processing scheme, a first acquisition means for acquiring from a predetermined storage the information concerning utilizable the structural components for generating a predetermined program on the basis of the processing scheme inputted through the first input means, a display means for displaying all or a part of the information acquired by the first acquisition means, a second input means for inputting information concerning the structural components for generating the predetermined program on the basis of the information displayed by the display means, and a first generating means for generating the predetermined program on the basis of the information inputted through the second input means.

By virtue of the arrangement of the program generating apparatus described above, the efficiency of development of the program can significantly be enhanced. Besides, because of possibility of defining in detail the structures of the structural parts or components and forms of combination or linkage, there can be created or generated the program of high quality. Incidentally, in a preferred mode for carrying out the present invention, the first input means is constituted by a processing scheme input module of an XML (eXtensible Markup Language) processing scheme selecting unit, the first acquisition means is constituted by a component providing unit, the display means is constituted by a component display module of a control information definition unit, the second input means is constituted by a control information input module of the control definition unit, and the first generating means is constituted by a control program generating unit. Further, the predetermined storage is comprised of an XML scheme storage and a component storage.

Further, in the program generating apparatus according to the present invention, the input processing performed through the first input means may be realized by selecting a desired processing scheme from a list of processing schemes prepared in advance.

With the arrangement of the program generating apparatus mentioned above, the program developer or operator can speedily and easily carry out the processing scheme inputting operation.

Furthermore, in the program generating apparatus according to the present invention, a plurality of the processing scheme lists may be provided. In that case, the input processing performed through the first input means can be realized by selecting the processing schemes from the plurality of lists on a list-by-list basis, while the first acquisition means can be so designed as to acquire the information concerning the utilizable structural components for generating a predetermined program by screening the information on the basis of the plural processing schemes selected by the first input means.

Owing to the arrangement of the program generating apparatus described above, the information concerning the utilizable structural components can be screened by merging the processing schemes classified in different types or categories, whereby the input processing through the second input means is much facilitated. In addition, the amount of data to be handled in the course of processing can be reduced.

Additionally, in the program generating apparatus according to the present invention, the information concerning the utilizable structural components acquired through the first acquisition means for generating the predetermined program may include at least one of a list of structural components, linking constraints imposed on the structural components and programs of the structural components.

With the arrangement described above, the information required for creating or generating the program can be obtained.

Further, the display means may be so designed as to display at least a list of structural components among the information acquired through the first acquisition means. Furthermore, the input processing executed by the second input means may be realized by selectively inputting desired structural components from the list of the structural components displayed by the display means and additionally inputting designatively the linking relation(s) among the selected structural components.

By virtue of the arrangement of the program generating apparatus described above, a list of the structural components can be displayed. Thus, the developer can easily select the required structural components and designate the combination or interlinkage form of the selected structural components. In this way, the program which conforms to the desired or demanded program specifications can easily be generated.

Moreover, the second input means may be comprised of a first decision means for making decision as to permissibility of contents of the information concerning the inputted structural components on the basis of the linking constraints imposed for the structural components acquired through the first acquisition means upon inputting of the information concerning the structural components, whereby a predetermined input processing can be executed on the basis of result of the decision made by the first decision means.

With the arrangement of the program generating apparatus described above, the information inputted through the second input means can be made to satisfy the linking constraints imposed among the predetermined components. Thus, the program of high quality and enhanced consistency can be generated.

Additionally, in the program generating apparatus, the first generating means may be composed of a second acquisition means for acquiring from the predetermined storage the programs of the structural components selectively inputted through the second input means. In that case, the predetermined program can be generated by interlinking the programs of the structural components acquired through the second acquisition means on the basis of the linking relations imposed among the structural components inputted designatively through the second input means.

With the arrangement of the program generating apparatus described above, the programs of the structural components can be fetched upon generation of the predetermined program rather than the time point when the processing scheme is selected. Thus, the amount of data handled internally of the program generating apparatus can be diminished with the burden imposed on the apparatus being remarkably mitigated. Incidentally, in the modes for carrying out the invention described hereinafter, the second acquisition means may be constituted by the data acquiring module of the control program generating unit.

Further, the program generating apparatus according to the present invention may include a third input means for inputting information for altering a generated program, and a second generating means for regenerating the predetermined program on the basis of the information inputted through the third input means.

With the arrangement of the program generating apparatus described above, correction such as addition of required source code(s), etc. can be performed after the automatic generation of the program. Thus, the program of high quality can be generated. Incidentally, in another preferred mode for carrying out the present invention, the third input means may be constituted by the control information input module of the control information defining unit and the program modifying input module of the control program generating unit. Further, the second generating means may be constituted by the program generating module of the control program generating unit.

Furthermore, the display means may be so designed as to display a list of structural components which can be utilized for generating at least the predetermined program. The input processing performed by the third input means may be so executed that the structural component contained in the list of the structural components displayed by the display means is added or alternatively the structural component already selected is deleted from the list of the structural components in response to the information inputted through the second input means, to thereby alter the structural components of the generated program while inputting designatively the linking relation relevant to the altered structural components.

With the above-mentioned arrangement of the program generating apparatus designed for altering the generated program, it is possible to alter or modify or change the generated program simply by changing the utilizable structural components. Thus, the developer or operator can easily alter or modify the program.

Furthermore, the third input means may include a second decision means for making decision as to permissibility of the contents of the inputted alteration information on the basis of the linking constraints imposed on the structural components as acquired through the first acquisition means upon inputting of the information for altering the generated program. In that case, a predetermined input processing can also be executed on the basis of the result of the decision made by the second decision means.

With the arrangement of the program generating apparatus described above, the predetermined linking constraints imposed among the predetermined components can be satisfied even in the case of alteration of the generated program. Thus, there can be generated the program of high consistency and high quality. Incidentally, in a preferred mode for carrying out the invention, the second decision means is constituted by the input information decision module of the control information defining unit, as will be described later on.

Additionally, the input processing executed by the third input means can be realized by editing directly the source codes for the generated program.

Owing to the feature mentioned above, the program can be modified or changed very finely. Thus, the program generation can be performed in conformance with the changes of the specifications with high flexibility.

Besides, the third input means may be so designed as to perform both a first input processing which is so executed that the structural component contained in the list of the structural components displayed by the display means is added or the structural component already selected can be deleted by inputting a command for altering the structural components of the generated program while inputting designatively the linking relation for the structural components to be altered and a second input processing executed by editing directly the source codes for the generated program. In that case, the second generating means may be so designed as to regenerate the predetermined program by merging the input contents resulting from the first and second input processings mentioned above.

With the arrangement of the program generating apparatus described above, the generated program can be modified or altered through a plurality of different procedures by merging the contents of modifications, so that they can be reflected in the generation of program. Thus, the program development efficiency can significantly be enhanced.

Moreover, the program generating apparatus according to the present invention may further be provided with a guideline displaying means for displaying a guideline for the input processing executed by the first input means or the second input means or the third input means.

With the arrangement of the program generating apparatus described above, the developer can easily perform the input processing by referencing the guideline. Thus, even those who is rather poor in the knowledge of the program developing technology can easily and speedily generate the program. Incidentally, in a preferred mode for carrying out the present invention, the guideline displaying means is constituted by the processing scheme selecting guideline display unit of the XML processing scheme selecting unit and the utilization guideline display module of the control information defining unit, as described hereinafter.

Further, the program generating apparatus according to the present invention may further include a processing scheme registering means for adding or deleting or editing the processing scheme for a list of the processing schemes.

With the arrangement of the program generating apparatus described above, the list of the processing schemes can easily be changed. In this conjunction, in a preferred mode for carrying out the invention, the processing scheme registering means is constituted by an XML processing scheme registration unit, as will be described later on.

Furthermore, the program generating apparatus according to the present invention may additionally include a structural components registering means provided for the predetermined storage for adding or deleting or editing the information concerning the utilizable structural components for generating the predetermined program.

With the arrangement of the program generating apparatus described above, parts or components constituting a program can easily be changed. In this conjunction, in a preferred mode for carrying out the invention which will be described hereinafter, the structural components registering means is constituted by an XML processing scheme registration unit and a component registration unit.

In the program generating apparatus according to the present invention, the predetermined program may be a program which is destined for processing XML (eXtensible Markup Language) data.

Owing to the feature mentioned above, the XML data structure can easily be modified or changed afterwards. Thus, there arises no necessity of fixing in advance the data structure in correspondence to application. Thus, the present invention can enjoy enhanced utility effectiveness.

Moreover, according to another aspect of the present invention, there is proposed a program generating method which includes a first step of inputting a desired processing scheme, a second step of acquiring from a predetermined storage information concerning utilizable structural components for generating a predetermined program on the basis of the processing scheme inputted in the first step, a third step of displaying at least a part of the information acquired in the second step, a fourth step of inputting the information concerning the structural components for generating the predetermined program on the basis of the information displayed in the third step, and a fifth step of generating the predetermined program on the basis of the information inputted in the fourth step.

Besides, according to yet another aspect of the present invention, there is proposed a program generating program stored in a medium readable by a computer for allowing the computer to execute a processing of generating a predetermined program, which program is executed by a computer and includes a first step of inputting a desired processing scheme, a second step of acquiring from a predetermined storage information concerning utilizable structural components for generating a predetermined program on the basis of the processing scheme inputted in the first step, a third step of displaying at least a part of the information acquired in the second step, a fourth step of inputting the information concerning the structural components for generating the predetermined program on the basis of the information displayed in the third step, and a fifth step of generating the predetermined program on the basis of the information inputted in the fourth step.

Additionally, in the program generating apparatus according to the present invention, as the computer-readable medium, there may be mentioned a portable type recording medium such as CD-ROM, flexible disk, DVD disk, opto-magnetic disk, IC card or the like, a database storing a computer program or other computer and database thereof, transmission carrier on a transmission line and so forth.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 10 is a view showing an example of a program generated by a program generating module;

FIGS. 16(a) and 16(b) show examples of lists of components corresponding to individual processing schemes stored in an XML processing scheme storage together with relevant linking constraint information according to the fourth embodiment of the invention;

FIG. 19 is a view showing the generated program shown in FIG. 10 in the state in which source codes have been newly added;

FIG. 21 shows, by way of example, source codes of the program generated on the basis of a control information illustrated in FIG. 20; and FIG. 22 is a block diagram showing a functional structure of the program generating apparatus according to a sixth embodiment of the present invention.

DESCRIPTION OF THE PREFERRED EMBODIMENTS

Figure 1:
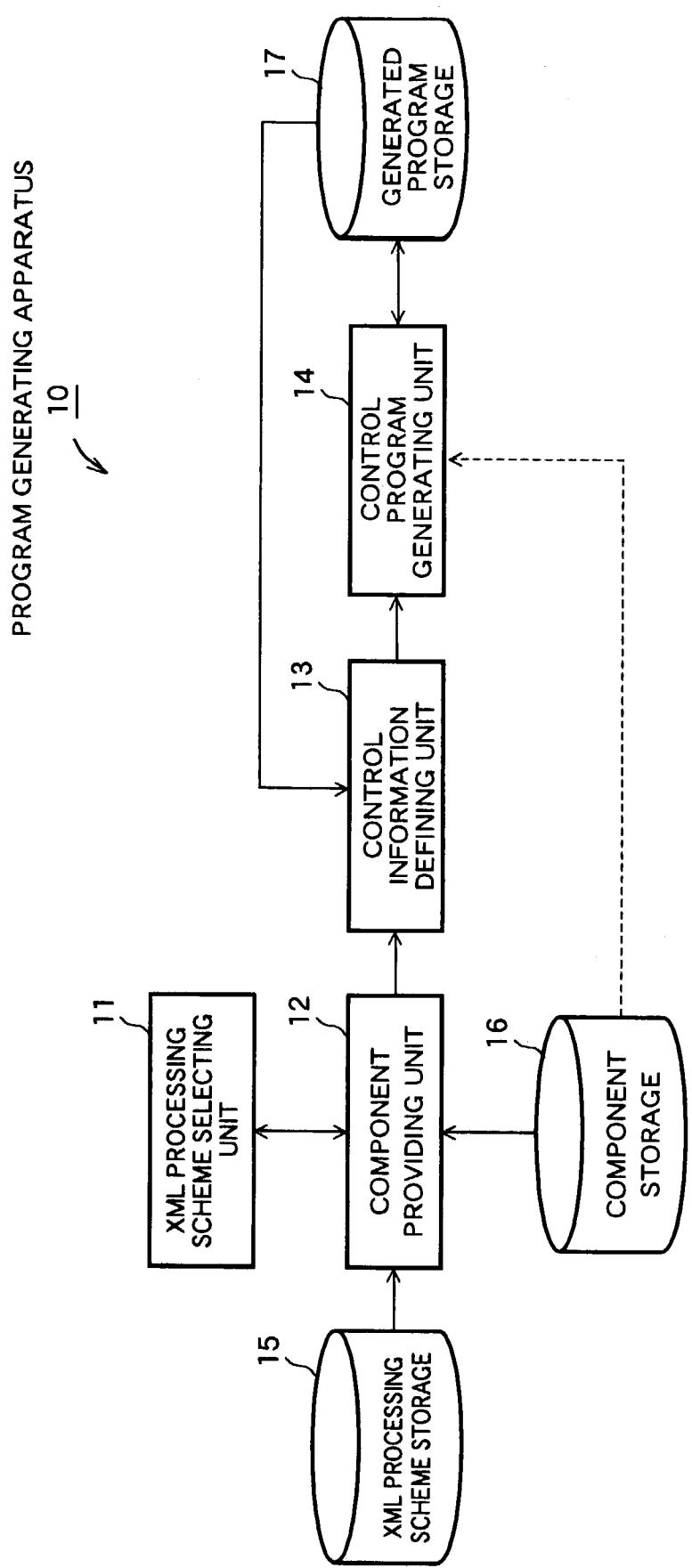
FIG. 1 is a block diagram showing generally a functional structure of a program generating apparatus according to a first embodiment of the present invention.

The present invention will be described in detail in conjunction with what is presently considered as preferred or typical embodiments thereof by reference to the drawings. In the following description, like reference characters designate like or corresponding parts throughout the several views.

Furthermore, in the description which follows, it is presumed, by way of example only, that all the programs generated in accordance with the teachings of the present invention incarnated in the embodiments described hereinafter are destined for processing the XML (eXtensible Markup Language) data.

Embodiment 1

FIG. 1 is a block diagram showing schematically and generally a functional configuration of the program generating apparatus according to a first embodiment of the present invention. As can be seen in FIG. 1, the program generating apparatus designated generally by reference numeral 10 is comprised of an XML processing scheme selecting unit 11, a component providing unit 12, a control information defining unit 13, a control program generating unit 14, an XML processing scheme storage 15, a component storage 16 and a generated program storage 17.

In the XML processing scheme storage 15, there are stored a list of XML processing schemes, lists of components which can be made use of in the XML processing schemes and linking constraints information of these components. Further stored in the component storage 16 are source codes of the individual components. The programs generated are stored in the generated program storage 17. Parenthetically, with the phrase "concatenating or linking constraints", it is contemplated to mean the restricting conditions or constraints which are imposed upon concatenation, linking or combination of the components such as the sequence or order in which the structural parts or components constituting the program are interlinked.

The XML processing scheme selecting unit 11 is designed to display an input image field for allowing an operator or program developer to selectively designate the contents of processing to be executed (processing scheme) for generating the desired program to thereby output the information concerning the processing scheme selectively designated by the developer from the input image field to the component providing unit 12. On the other hand, the component providing unit 12 is designed to acquire necessary data from the XML processing scheme storage 15 and the component storage 16 on the basis of the information concerning the processing scheme supplied from the XML processing scheme selecting unit 11, the acquired data being then transferred to the control information defining unit 13.

The control information defining unit 13 is so designed as to present the available or utilizable components to the operator or developer while providing the developer with an editor for allowing him or her to select the components required for structurizing the desired program and input the concatenating or linking relations to be realized between or among the components. The information concerning the selected components and the linking relation is then supplied to the control program generating unit 14. On the other hand, the control program generating unit 14 serves to generate the relevant program on the basis of the information furnished from the control information defining unit 13. The program generated by the control program generating unit 14 is then stored in the generated program storage 17.

Next, description will be made in detail of the processing procedure for program generation with the aid of the program generating apparatus implemented in the configuration described above.

Figure 2:
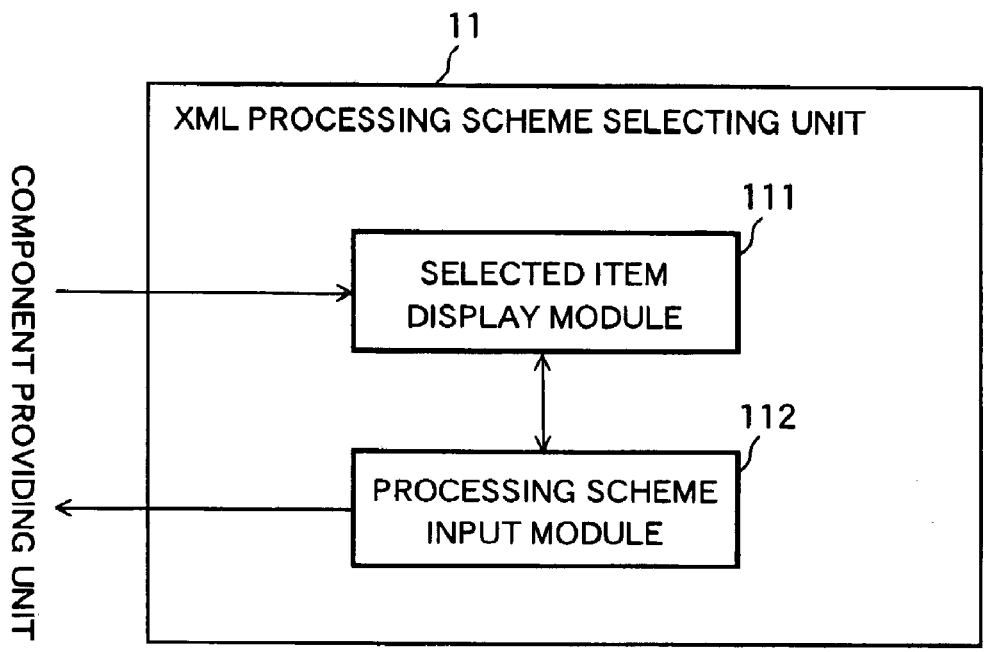
FIG. 2 is a block diagram showing a functional structure of an XML processing scheme selecting unit.

At first, the developer selectively designates the processing contents of the program to be generated from a predetermined input screen image. In this conjunction, the predetermined input screen image mentioned above is supplied from the XML processing scheme selecting unit 11. FIG. 2 is a block diagram showing a functional structure of the XML processing scheme selecting unit 11. Referring to the figure, the XML processing scheme selecting unit 11 is comprised of a selected item display module 111 and a processing scheme input module 112. The selected item display module 111 is designed to display the predetermined input image mentioned above, while the processing scheme input module 112 is designed to respond to the input operation of the developer to thereby supply the corresponding input information to the component providing unit 12.

Figure 3:
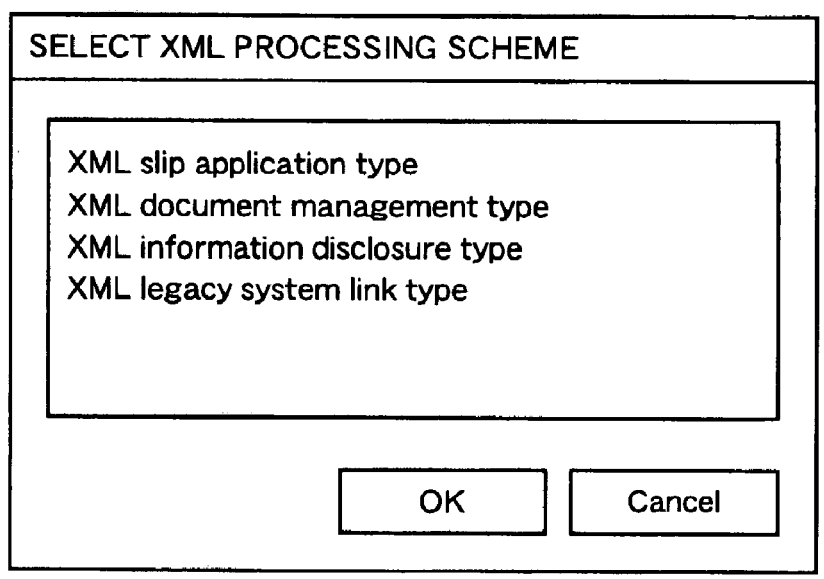
FIG. 3 is view for illustrating an example of an input image displayed by a selected item display module.

FIG. 3 is a view for illustrating an example of the input image displayed by the selected item display module 111. As can be seen in the figure, a list of the XML processing schemes is displayed so that the operator or developer can easily select a desired one from the displayed processing schemes. Needless to say, the list of the processing schemes to be displayed is acquired from the XML processing scheme storage 15 through the medium of the component providing unit 12. As to the classification of the XML processing schemes, there are conceivable various methods. In the program generating apparatus according to the instant embodiment of the invention now under consideration, it is presumed that the XML processing schemes are classified on the basis of the contents of the processings to be executed through the programs designed for processing the XML data, respectively. At this juncture, it is supposed that the developer selects "XML slip application type". In that case, the processing scheme input module 112 transfers the selected relevant information to the component providing unit 12.

Figure 4:
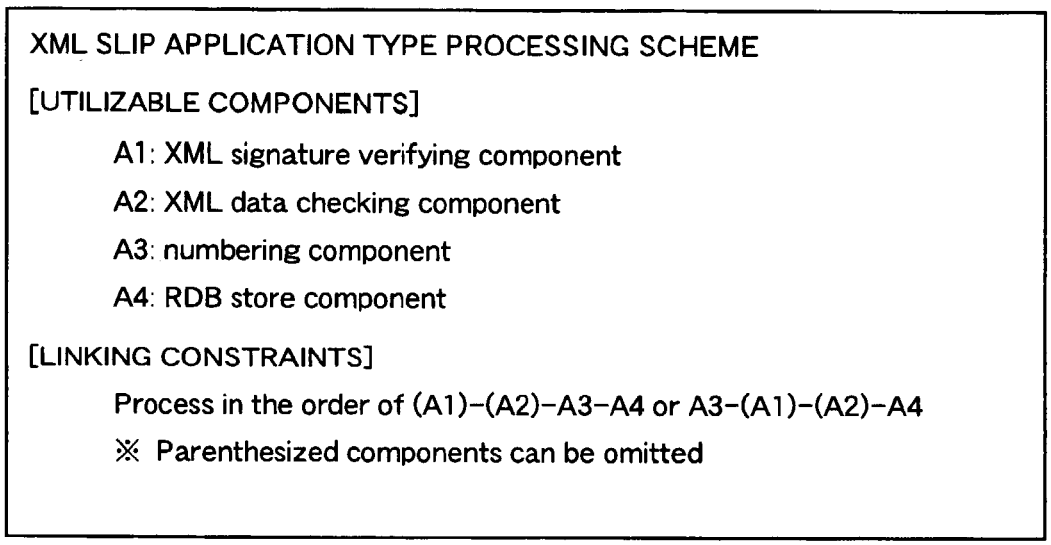
FIG. 4 is a view showing an example of information acquired by a component providing unit.

In response, the component providing unit 12 acquires the components utilizable for generating the selected processing scheme (e.g. the XML slip application type processing scheme in the case of the instant example) from the XML processing scheme storage, 15 together with the concatenating or linking constraint information concerning the concatenating or linking order of the individual components, possibility/impossibility of omission and others. FIG. 4 is a view showing an example of the information as acquired. At the same time, the component providing unit 12 acquires source codes of the utilizable individual components from the component storage 16. The source code data as acquired are then transferred to the control information defining unit 13.

Figure 5:
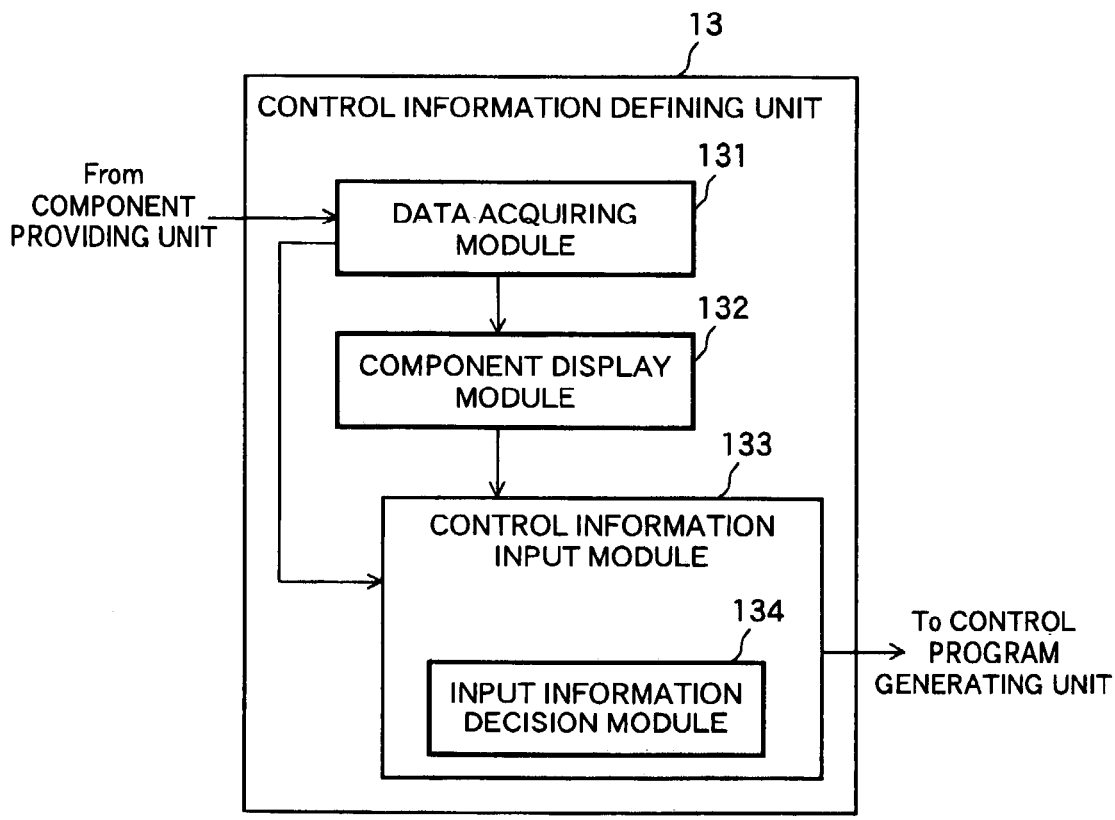
FIG. 5 is a block diagram showing a functional structure of a control information defining unit.

The control information defining unit 13 is so arranged as to be capable of inputting the components made use of by the developer and the linking information of these components (hereinafter this information will also be referred to as the control information) on the basis of the information obtained from the component providing unit 12. FIG. 5 is a block diagram showing a functional structure of the control information defining unit 13. As can be seen in the figure, the control information defining unit 13 is composed of a data acquiring module 131 for acquiring data from the component providing unit 12, a component display module 132 for displaying the available components, and a control information input module 133 for inputting the control information (the component linking information). At this juncture, it should be added that the control information input module 133 includes an input information decision module 134 which is designed to check whether or not the control information inputted satisfies the constraint conditions.

Figure 6:
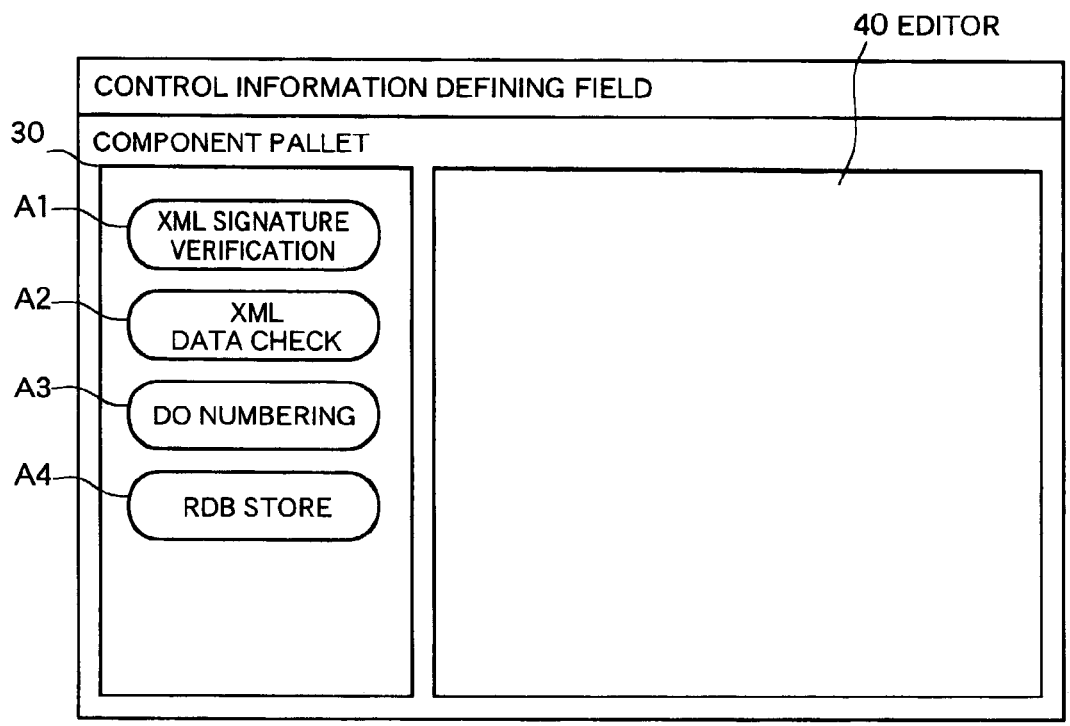
FIG. 6 is a view for illustrating an example of a control information input screen image.

In operation, the data acquiring module 131 firstly acquires the data from the component providing unit 12. In the case of the program generating apparatus according to the instant embodiment of the invention, it is presumed that all the information acquired by the component providing unit 12 (i.e., the source codes of the components and the information shown in FIG. 4) is fetched by the data acquiring module 131. The component display module 132 displays the available or utilizable components in the input image field for allowing the developer to selectively input the control information. FIG. 6 is a view for illustrating, by way of example only, the input screen image. In the program generating apparatus according to the instant embodiment of the invention, there are displayed in the area of a so-called component pallet 30 the available or utilizable components A1, A2, A3 and A4 shown in FIG. 4. The control information input module 133 accepts the inputs of the developer to the editor 40. The developer can dispose the components required for generating the desired program on the editor field from the component pallet 30 through the drag-and-drop manipulation with the aid of a mouse.

Figure 7:
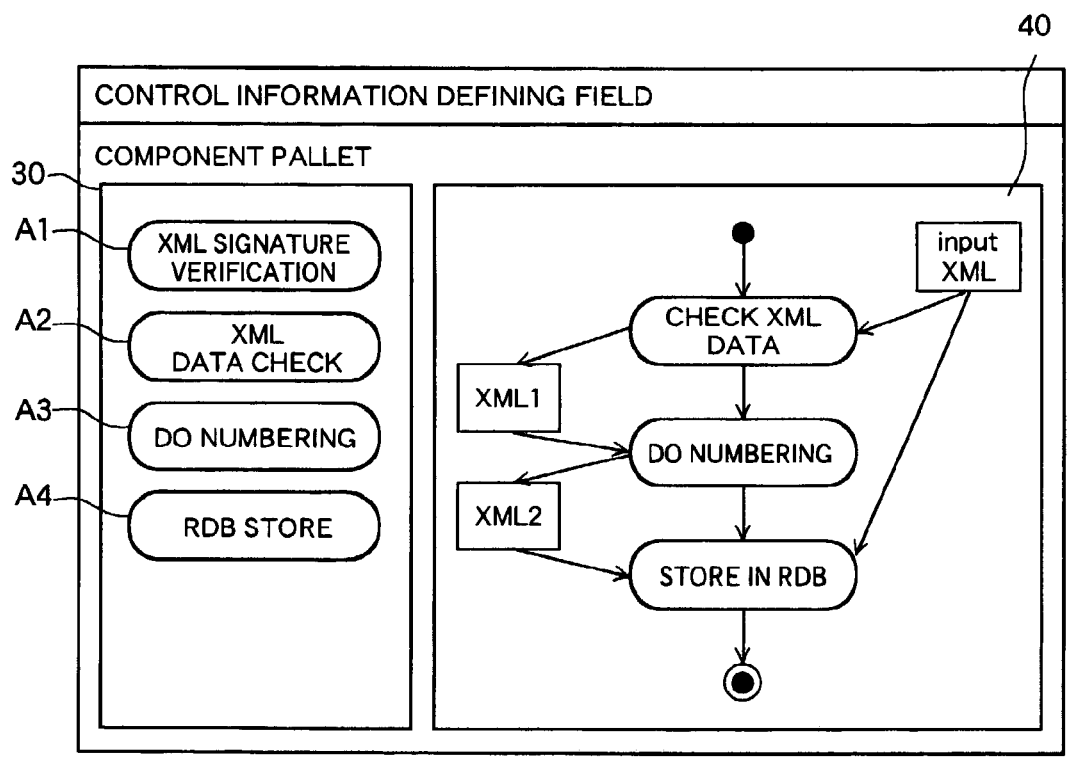
FIG. 7 is a view for illustrating an example of control information disposed on an editor.

FIG. 7 is a view for illustrating, by way of example only, the control information disposed on the editor 40. As can be seen in this figure, the components A2 "XML data check", A3 "numbering" and A4 "RDB store (store in Relational DataBase" are sequentially linked in the form of a processing procedure flow, wherein XML data input/output flows are added to the above-mentioned processing procedure flow. Upon completion of the input operation by the developer, the input information decision module 134 checks the control information disposed on the editor field 40 by referencing the linking constraint information fetched from the component providing unit 12 as to whether or not the control information satisfies the concatenating or linking constraints as imposed (see FIG. 4). In the case of the example illustrated in the FIG. 7, the control information satisfies the linking constraints "process in the order of (A1)-(A2)-A3-A4 or alternatively A3-(A1)-(A2)-A4". Accordingly, it is determined that no problem arises as to the input contents.

Figure 8:
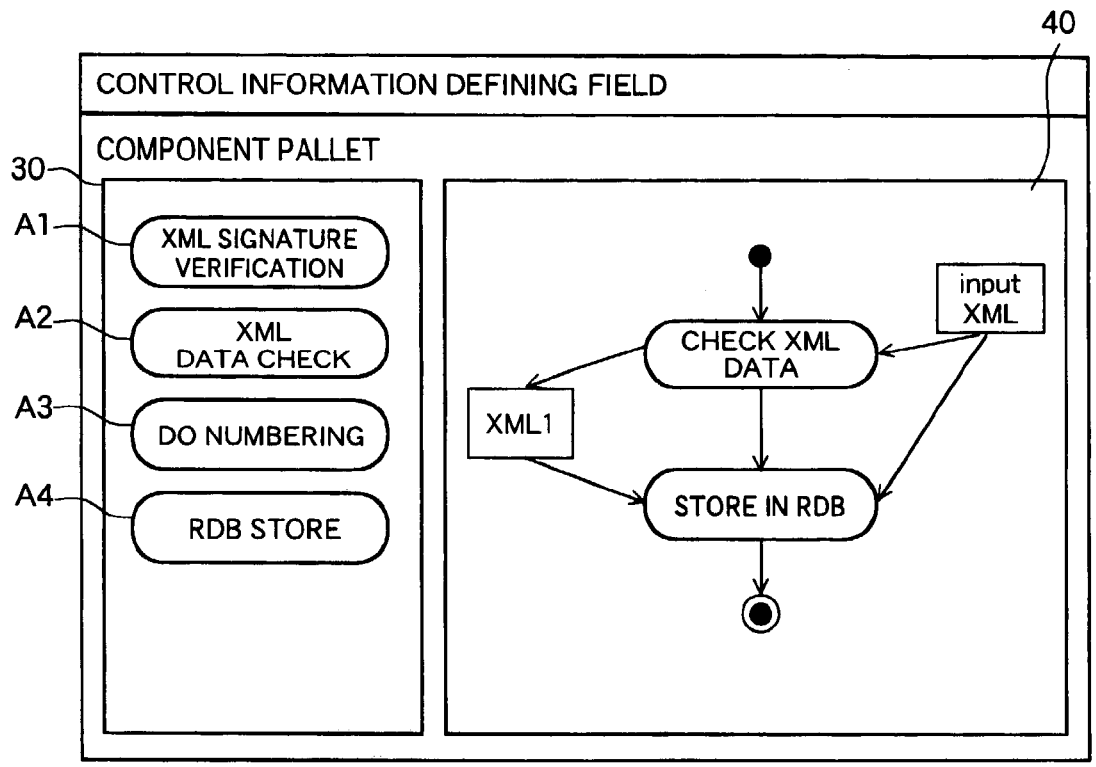
FIG. 8 is a view for illustrating another example of the control information disposed on the editor.

FIG. 8 shows another example of the control information disposed on the editor field 40. In the case of this example, the component A3 which must not be omitted in view of the linking constraints is not employed. Consequently, the input information decision module 134 makes decision that the linking constraints are not satisfied and thus rejects the input contents while issuing an error message or the like (not shown) to thereby prompt the developer to input again the control information.

Figure 9:
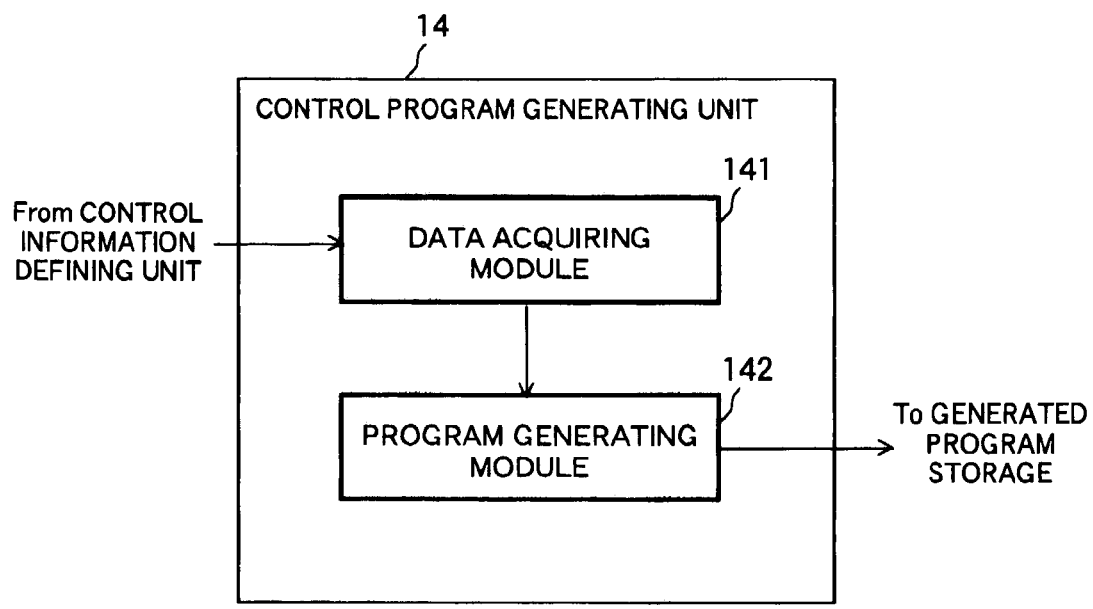
FIG. 9 is a block diagram showing a functional structure of a control program generating unit.

So far as the inputted control information does not suffer any problem, the control information input module 133 then outputs to the control program generating unit 14 the defined control information mentioned above and the source codes of the components contained in the above-mention control information acquired from the component providing unit 12. FIG. 9 is a block diagram showing a functional structure of the control program generating unit 14. As can be seen in this figure, the control program generating unit 14 is comprised of a data acquiring module 141 designed for fetching or acquiring the data from the control information defining unit 13 and a program generating module 142 designed for generating a program from the data acquired. The program generating module 142 is designed to generate the program by concatenating or linking or combining the source codes of the individual components in conformance with the control information defined by the control information defining unit 13. FIG. 10 is a view showing an example of the program generated by the program generating module 142. As can be seen, the generated program is composed of the components A2, A3 and A4 in conformance with the control information shown in FIG. 7. The program generating module 142 stores the generated program in the generated program storage 17.

At this junction, it should be mentioned that although it has been presumed that the XML processing schemes to be selected by the XML processing scheme selecting unit 11 are classified into various types in dependence on the contents of processings executed by the programs destined for processing the XML data. However, it should be appreciated that the present invention is never restricted thereto. Needless to say, the XML processing scheme to be selected may be classified in dependence on the types of data handled in the course of execution of the program.

Further, although it has been mentioned in the forgoing description that the components are disposed on the editor 40 through the drag-and-drop procedure, the present invention is never restricted thereto. The components may be defined by resorting to other means.

Embodiment 2

A second embodiment of the present invention is directed to the program generating apparatus which is imparted with a function for aiding or supporting the developer in his or her execution of selecting processing by displaying a guideline for the selection of the XML processing scheme. Incidentally, it is presumed that the configuration of the program generating apparatus as a whole is essentially same as what has been described hereinbefore by reference to FIG. 1.

Figure 11:
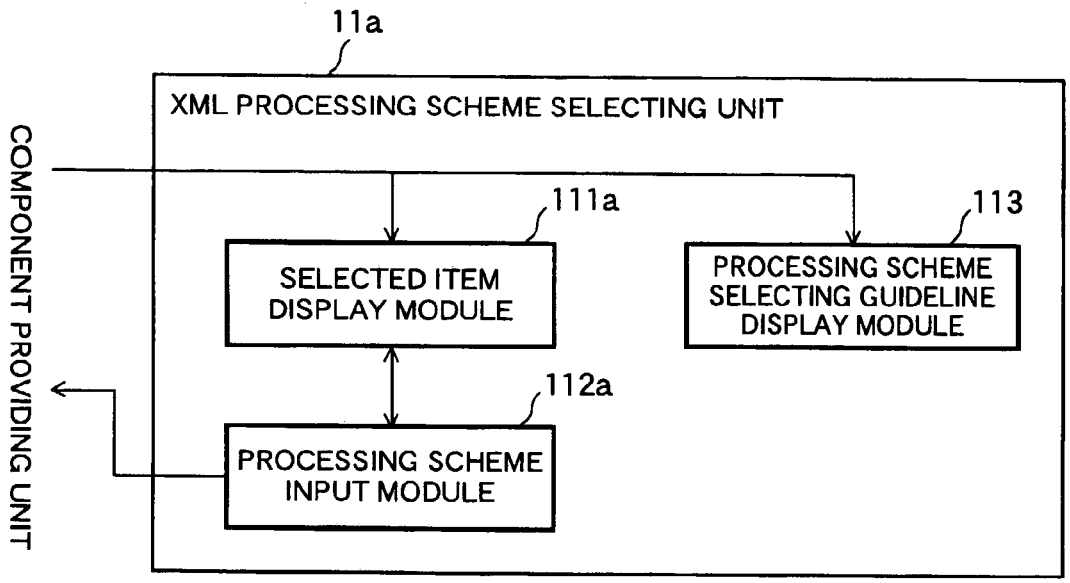
FIG. 11 is a block diagram showing a functional structure of the XML processing scheme selecting unit according to a second embodiment of the present invention.
Figure 12:
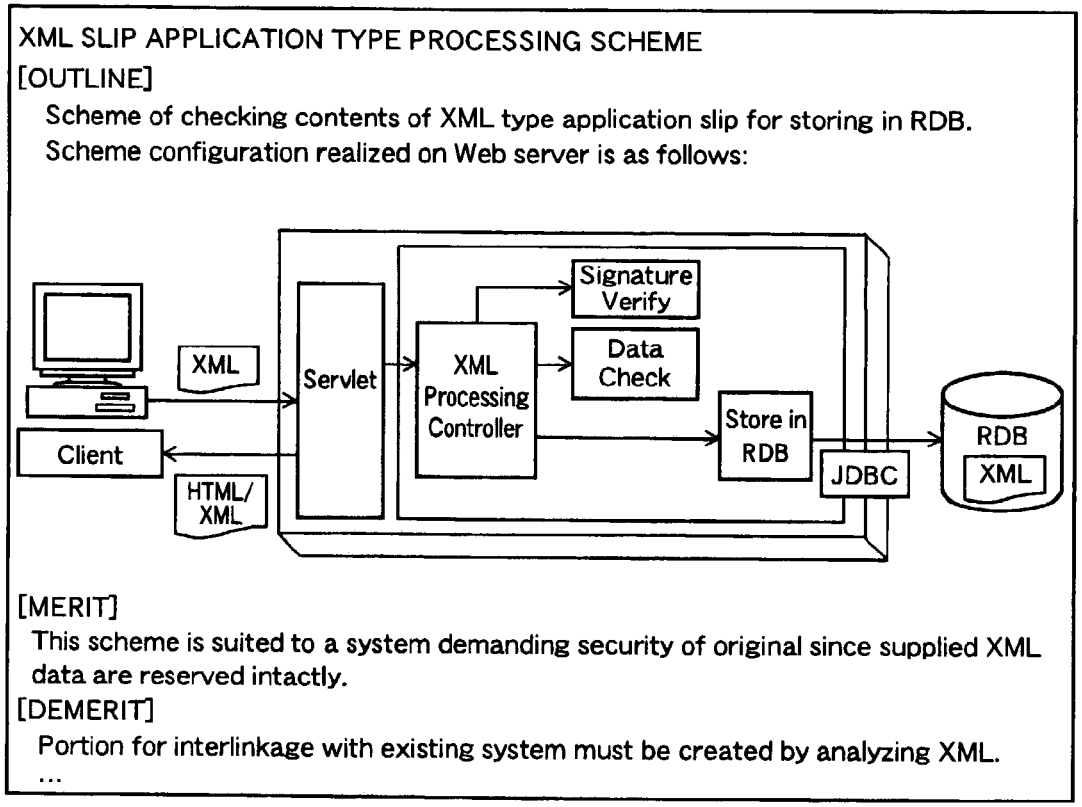
FIG. 12 is a view showing an example of a guideline displaying image field for selecting a processing scheme.

FIG. 11 is a block diagram showing the functional structure of an XML processing scheme selecting unit 11a of the program generating apparatus according to the instant embodiment of the invention. As can be seen in the figure, the XML processing scheme selecting unit 11a is comprised of a selected item display module 111a, a processing scheme input module 112a and a processing scheme selecting guideline display module 113. Incidentally, operations or functions of the selected item display module 111a and the processing scheme input module 112a are similar to those of the corresponding modules 111 and 112 described hereinbefore in conjunction with the first embodiment of the invention. Accordingly, repetitive description of these modules 111a and 112a will be unnecessary. The processing scheme selecting guideline display module 113 of the program generating apparatus according to the instant embodiment of the invention is designed or arranged such that a guideline displaying image field is additionally generated on an input image screen for displaying the outlines of the individual selected items (processing schemes), advantages (merits) and disadvantages (demerits) thereof and others. The data to be displayed are acquired from the XML processing scheme storage 15 through the medium of the component providing unit 12. FIG. 12 is a view showing an example of the guideline displaying image. By referencing this image, the developer can grasp in more concrete the contents of the processing schemes, whereby he or she can easily select the desired processing scheme.

Embodiment 3

A third embodiment of the present invention is directed to the program generating apparatus which is imparted with a function for aiding or supporting the developer in his or her performing the control information input processing by displaying a guideline for utilization of the components when the control information is inputted.

Figure 13:
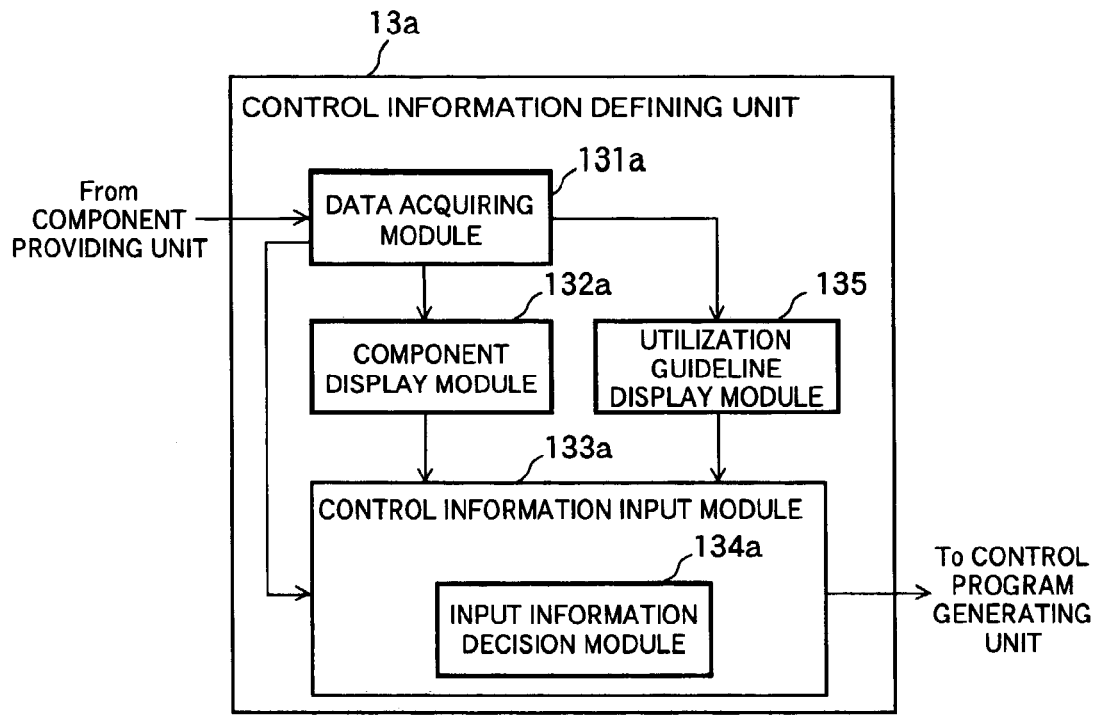
FIG. 13 is a block diagram showing a functional structure of the control information defining unit according to a third embodiment of the present invention.
Figure 14:
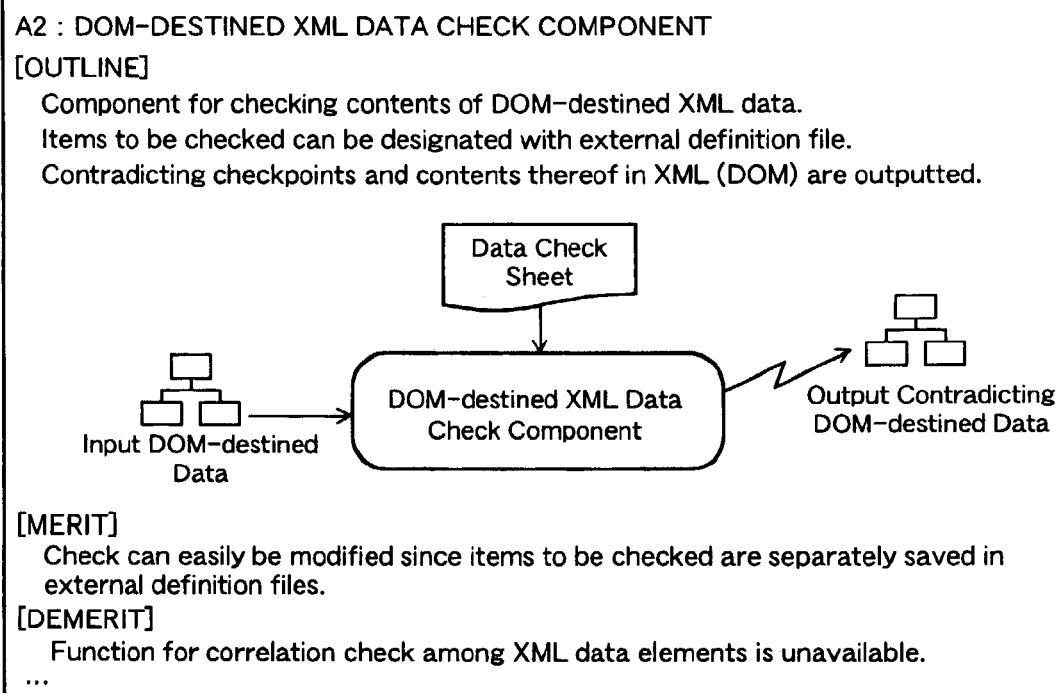
FIG. 14 is a view showing an example of a guideline displaying image for inputting the control information.

FIG. 13 is a block diagram showing a functional structure of a control information defining unit 13a of the program generating apparatus according to the instant embodiment of the invention. As can be seen in the figure, the control information defining unit 13a is comprised of a data acquiring module 131a, a component display module 132a, a control information input module 133a, an input information decision module 134a and a utilization guideline display module 135. Incidentally, the functions of the data acquiring module 131a, the component display module 132a, the control information input module 133a and the input information decision module 134a are similar to those of the modules 131, 132, 133 and 134 described hereinbefore in conjunction with the first embodiment of the present invention. Accordingly, repetitive description of these modules will be unnecessary. The utilization guideline display module 135 incorporated in the program generating apparatus according to the instant embodiment of the invention is so arranged as to generate an additional display field for displaying a guideline image field on the image screen for inputting the control information, wherein the outline or features of the utilizable components as well as advantages (merits) and disadvantages (demerits) thereof are displayed in the additionally generated display field. The data for the display are extracted from the data acquired by the data acquiring module 131a from the component providing unit 12. FIG. 14 is a view showing an example of the guideline displaying image. By referencing this image, the developer can grasp in more concrete the contents of the components, whereby he or she can easily perform the definition processing.

Embodiment 4

A fourth embodiment of the present invention is directed to the program generating apparatus which is arranged such that a plurality of lists of selected items (processing schemes) are generated upon selection of the XML processing scheme and that the utilizable components are screened out by combining plural selected items to allow the linking constraints to be merged. Incidentally, the configurations of the program generating apparatus in general and the structure of the XML processing scheme selecting unit are essentially similar to those described hereinbefore by reference to FIGS. 1 and 2.

Figure 15A:
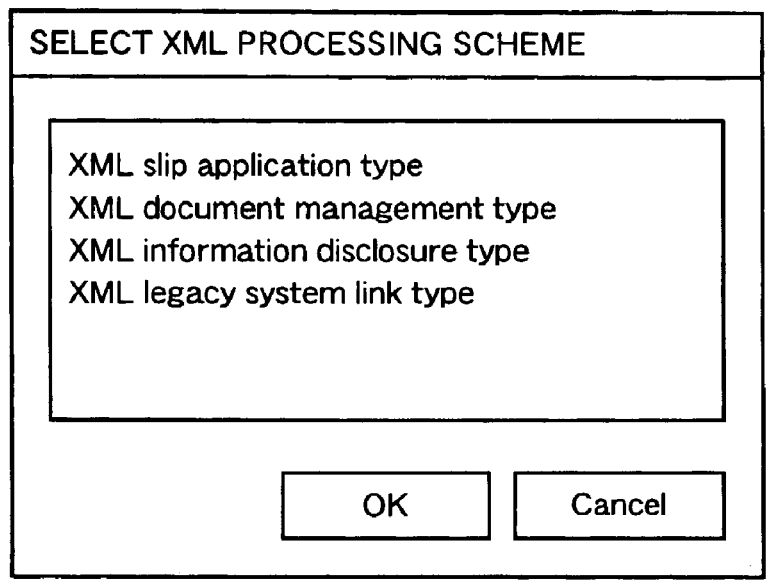
FIGS. 15(a) and 15(b) show examples of an input image field for selecting the processing scheme which is presented by a selected item display module of the XML processing scheme selecting unit according to a fourth embodiment of the present invention.
Figure 15B:
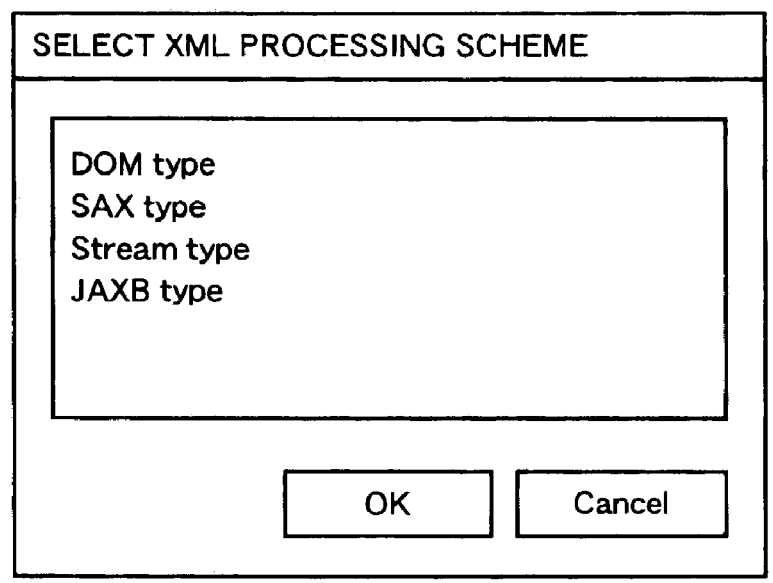

FIGS. 15(a) and 15(b) show examples of the input image presented by the selected item display module 111 of the XML processing scheme selecting unit 11. Referring to the figures, the processing scheme selecting image classified in dependence on the processing contents of the program destined for the XML data processing is displayed (see FIG. 15(a)). At this juncture, it is supposed that the operator or developer has selected "XML slip application type processing scheme". Then, the processing scheme selecting image containing the processing schemes classified on the basis of the processing procedure types of the XML data to be handled is displayed (FIG. 15(b)). In this conjunction, it is supposed that the "DOM (Design Optimization Model) type" is selected. Then, the processing scheme input module 112 of the XML processing scheme selecting unit 11 outputs the results of selection intactly to the component providing unit 12.

Figure 17:
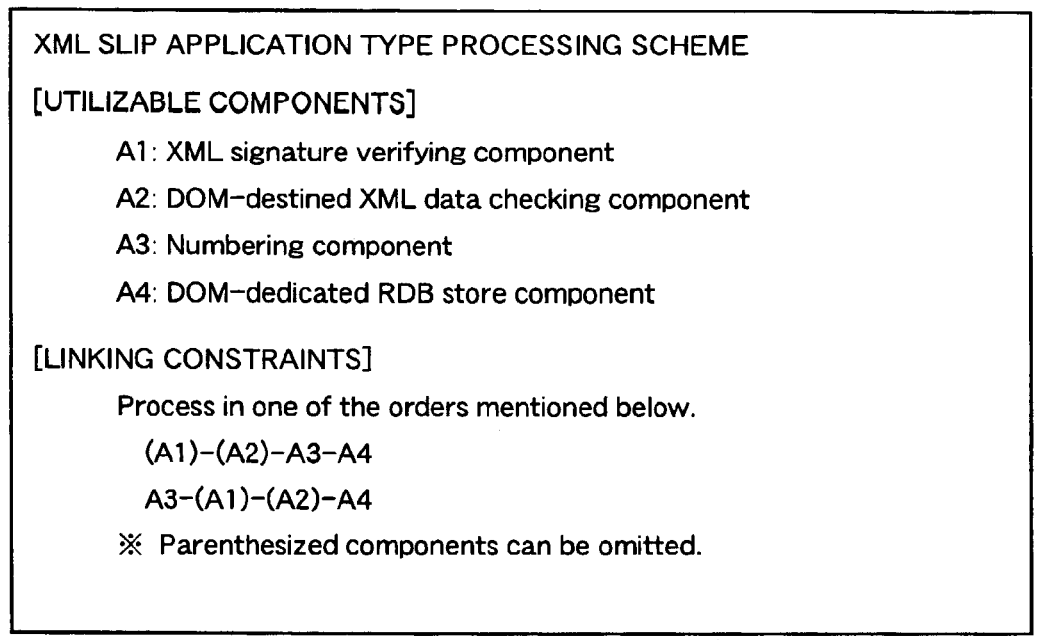
FIG. 17 shows an example of data obtained by merging the data shown in FIGS. 16(a) and 16(b)

FIGS. 16(a) and 16(b) show examples of lists of components corresponding to the processing scheme stored in the XML processing scheme storage 15 together with the relevant concatenating or linking constraint information. The component providing unit 12 first acquires the component list and the linking constraint information which correspond to the processing scheme "XML slip application type" shown in FIG. 16(a). In succession, the component providing unit 12 acquires the component list and the linking constraint information corresponding to the processing scheme "DOM (Design Optimization Model) type processing scheme" shown in FIG. 16(b). Subsequently, the component providing unit 12 screens out the utilizable components on the basis of the acquired data to thereby merge the linking constraints. More specifically, the utilizable components common to both the component lists (i.e., product set of the components) are extracted, and then the merged information of both the linking constraint information relevant to the extracted components (i.e., sum set of the linking constraints) is taken out. The list of the component and the linking constraint information obtained in this manner are transferred to the control information defining unit 13. FIG. 17 shows an example of the data obtained by merging the data shown in FIGS. 16(a) and 16(b).

Embodiment 5

Next, description will be made of a fifth embodiment of the present invention. The program generating apparatus according to the instant embodiment is designed to edit the program generated through the procedures described hereinbefore so that predetermined specifications are satisfied, while changing the components constituting the generated program in conformance with alteration of the specifications. Parenthetically, it is presumed that the configuration of the program generating apparatus in general is similar to that shown in FIG. 1.

Figure 18:
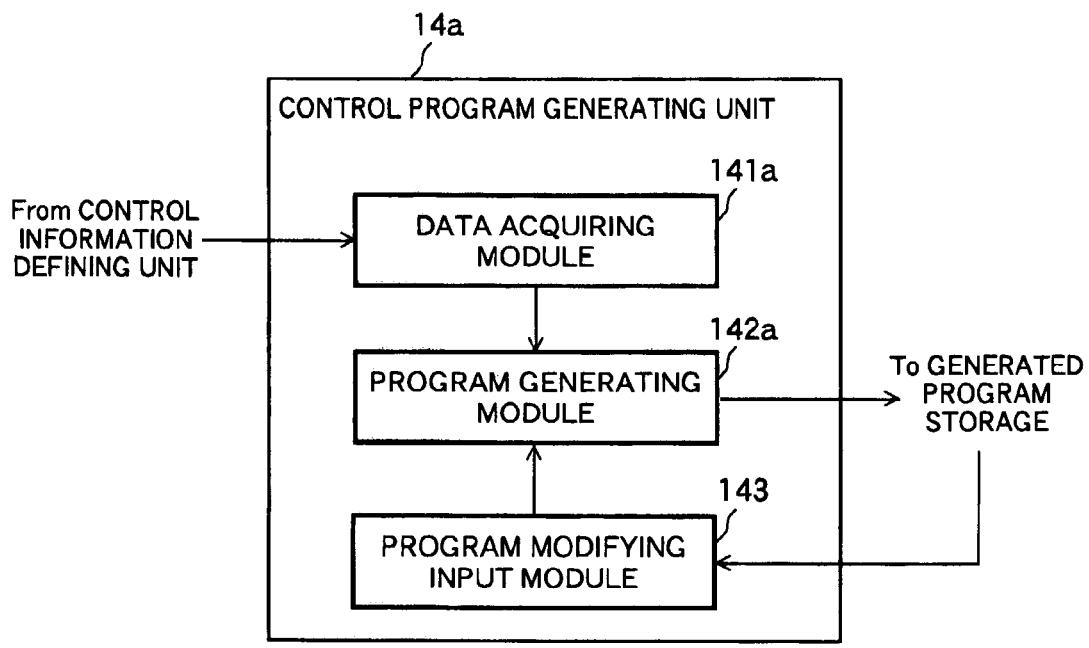
FIG. 18 is a block diagram showing a functional structure of a control program generating unit of the program generating apparatus according to a fifth embodiment of the present invention.

FIG. 18 is a block diagram showing a functional structure of a control program generating unit 14a of the program generating apparatus according to the fifth embodiment of the invention. As can be seen in the figure, the control program generating unit 14a is comprised of a data acquiring module 141a, a program generating module (program generator) 142a and a program modifying input module 143. The functions of the data acquiring module 141a and the program generating module 142a are similar to those described previously in conjunction with the first embodiment of the invention. Accordingly, repetitive description thereof will be unnecessary.

The program modifying input module 143 serves for the function for modifying or altering the program generated by the program generating module 142a or the program already stored in the generated program storage 17. More specifically, the program modifying input module 143 is designed to display the source codes of the generated program on the editor field of the display screen (not shown) to thereby allow the operator or developer to edit the source codes which are being displayed for modifying or altering the program. FIG. 19 is a view showing the generated program shown in FIG. 10 in the state in which source code (portion indicated by "B" in FIG. 19) has been newly added by the developer. In succession to the edition, the program is formally regenerated (i.e., generated again) by the program generating module 142a to be stored in the generated program storage 17.

Figure 20:
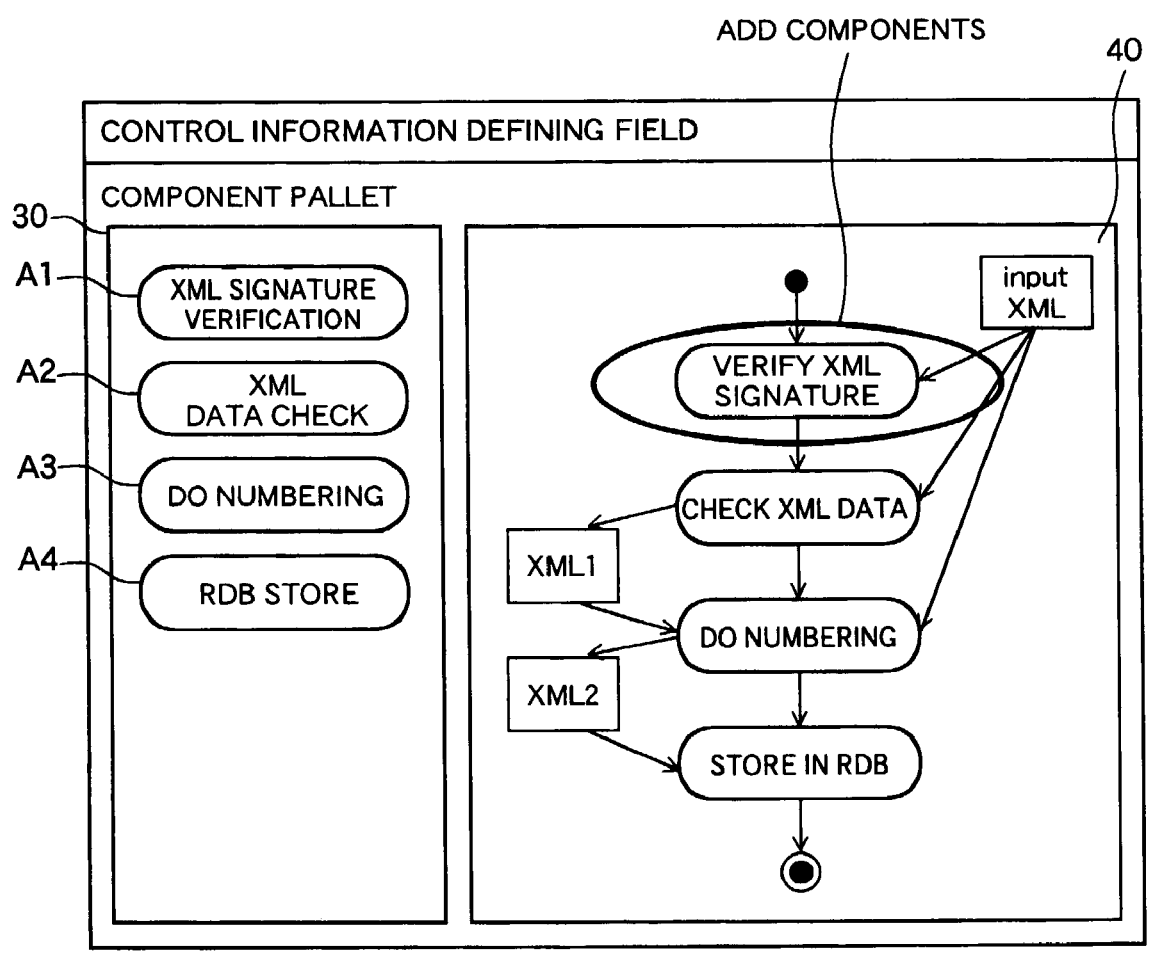
FIG. 20 shows the state in which program components have been added by a control information defining unit.

At this juncture, it is assumed that there arises the necessity of adding the XML signature verifying function for the regenerated program shown in FIG. 19 because of alteration of the specifications. In that case, the control information definition module 13 is activated by the developer through predetermined manipulation to read the relevant generated program (not shown) from the generated program storage 17 and display the input image shown in FIG. 7. In the editor field 40, there are displayed components in an interlinked state. At this time point, the control information definition module 13 acquires the source codes of the components displayed in the component pallet 30 from the component storage 16 through the medium of the component providing unit 12. In this conjunction, it is presumed, by way of example, that the developer drags the component A1 "XML signature verification" from the component pallet 30 to drop it in the editor 40. FIG. 20 shows the state in which components have been added.

In this case, decision is also made by the input information decision module 134 incorporated in the control information input module 133 (see FIG. 5) as to whether or not the control information newly added satisfies the linking constraint. So far as no problem is found in the inputted control information, the control information input module 133 transfers to the control program generating unit 14 the information mentioned above together with the source codes of the components acquired from the component providing unit 12.

The control information definition module 13 transfers the defined control information (see FIG. 20) to the control program generating unit 14. The program generating module 142a incorporated in the control program generating unit 14 regenerates a program from the data acquired, the regenerated program being then stored in the generated program storage 17. FIG. 21 shows, by way of example, the source codes of the program generated on the basis of the control information illustrated in FIG. 20. As can be seen in FIG. 21, the defined source codes (A1 and relevant function A1-a) described by reference to FIG. 20 are added.

At this juncture, it should be mentioned that the source code B added directly by the developer (see FIG. 19) is protected without being erased. In the case of the instant embodiment of the invention, the source code portion sandwiched between "//begin code preservation" and "//end code preservation" represents a protected area. Any source code added in this area is protected regardless of the regeneration processing Thus, the developer is capable of generating a program by merging the source code added by the developer and the information redefined by the control information definition module 13.

Embodiment 6

A sixth embodiment of the present invention will be described. This embodiment is directed to the program generating apparatus which is imparted with a function for registering newly the data in the XML processing scheme storage and the component storage. FIG. 22 is a block diagram showing a functional structure of the program generating apparatus according to the sixth embodiment of the invention. As is shown in the figure, the program generating apparatus 20 is comprised of an XML processing scheme selecting unit 21, a component providing unit 22, a control information defining unit 23, a control program generating unit 24, an XML processing scheme storage 25, a component storage 26, a generated program storage 27, an XML processing scheme registering unit 28 and a component registering unit 29. The functions of the above-mentioned modules except for the XML processing scheme registering unit 28 and the component registering unit 29 are similar to those described hereinbefore in conjunction with the first embodiment of the invention. Accordingly, repetitive description is omitted.

The XML processing scheme registering unit 28 provides a predetermined input image field (not shown). Thus, the operator can input while observing the image the information concerning the processing scheme to be newly registered in the XML processing scheme storage 25, i.e., the information such as name, features, merits, demerits, utilizable component list, linking constraint information of the components or the like of the processing scheme. In conjunction with the utilizable components, it is presumed that the identifier or ID or the name which can be linked to the component stored in the component storage 26 is inputted.

The component registering unit 29 is designed to present a predetermined input image for registration (not shown). Thus, the operator can input the ID or name of the component to be newly registered to thereby store the relevant source code in the component storage 26 from a given storing medium.

Incidentally, it should be added that the XML processing scheme registering unit 28 and the component registering unit 29 can also be so designed as to be capable of performing deletion, alteration or the like processing in addition to the new component add processing.

In the case of the program generating apparatuses according to the embodiments of the invention described hereinbefore, such arrangement is adopted that the structural component program is fetched or acquired by the component providing unit upon selection of the processing scheme to be subsequently supplied to the control program generating unit by way of the control information defining unit. However, such arrangement may equally be adopted in which instead of acquisition of the component program by the component providing unit, the data acquiring module incorporated in the control program generating unit acquires directly the component programs upon generation of a desired program. This alternative method is indicated in FIGS. 1 and 22 by broken line arrows extending from the component storage to the control program generating unit. In this case, it is sufficient to acquire only the relevant program on the basis of the component and the linking relation thereof as defined by the control information defining unit. Thus, the amount of data to be handled can significantly be reduced.

As is apparent from the foregoing description, according to the teachings of the present invention incarnated in the illustrated embodiments thereof, it is possible to select and concatenate or link arbitrarily the components on the basis of the processing contents and performance requirement of software to be structured by combining the components. Further, since the modes for selection of the components and combination thereof are automatically decided on the basis of the linking constraints, it is possible to generate the program which can enjoy high consistency. Thus, the program development efficiency can surprisingly be enhanced, and even the developer or operator of scanty knowledge is capable generating speedily the program of high quality which meets the desired specifications without encountering any appreciable difficulty, to great advantages.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact constructions and operations illustrated and described. Accordingly, all suitable modifications and equivalents may be resorted to, falling within the spirit and scope of the invention.

What is claimed is:

1. A program generating apparatus having processor for generating a program destined for processing XML data, comprising:

first input means for inputting a desired processing scheme selected from a plurality of processing schemes to process said XML data;

first acquisition means for acquiring information from a predetermined storage, the information concerning utilizable plural structural components for generating a predetermined program according to the desired processing scheme inputted through said first input means, said predetermined program being generated by linking said structural components;

display means for displaying at least a part of the information acquired by said first acquisition means;

second input means for selectively inputting information concerning the plural structural components for generating said predetermined program based on the part of the information displayed by said display means; and first generating means for generating said predetermined program by linking the plural structural components based on the information concerning the plural structural components inputted through said second input means while ensuring internal consistency of said predetermined program by using linking constraints.

2. A program generating apparatus according to claim 1, wherein input processing performed through said first input means is realized by selecting the desired processing scheme from a list of processing schemes prepared in advance.

3. A program generating apparatus according to claim 1, further comprising:

a plurality of said processing scheme lists with the plurality of processing schemes to process said XML data, wherein an input processing performed through said first input means is realized by selecting processing schemes from said plurality of lists on a list-by-list basis; and wherein said first acquisition means is designed to acquire the information concerning the utilizable structural components for generating the predetermined program by screening said information according to said plurality of processing schemes selected by said first input means.

4. A program generating apparatus according to claim 1, wherein the information concerning the utilizable structural components acquired through said first acquisition means for generating said predetermined program includes at least one of a list of structural components, linking constraints imposed on said structural components and programs of said structural components.

5. A program generating apparatus according to claim 4, wherein said display means is designed to display at least a list of structural components among the information acquired through said first acquisition means.

6. A program generating apparatus according to claim 5, wherein the input processing executed by said second input means is realized by selectively inputting desired structural components from said list of the structural components displayed by said display means and additionally inputting a predetermined linking relation among the selected structural components.

7. A program generating apparatus according to claim 4, said second input means including first decision means for making decision as to permissibility of contents of the information concerning the inputted structural components on the basis of the linking constraints imposed for the structural components acquired through said first acquisition means upon inputting of said information concerning said structural components, wherein a predetermined input processing is executed on the basis of result of the decision made by said first decision means.

8. A program generating apparatus according to claim 6, said first generating means including second acquisition means for acquiring from said predetermined storage programs of the structural components selectively inputted through said second input means, wherein said predetermined program is generated by interlinking the programs of the structural components acquired through said second acquisition means on the basis of the linking relations among the structural components inputted designatively through said second input means.

9. A program generating apparatus according to claim 1, further comprising:
third input means for inputting information for altering a generated program; and
second generating means for regenerating said predetermined program on the basis of information inputted through said third input means.

10. A program generating apparatus according to claim 9, said display means being designed to display a list of structural components which can be utilized for generating at least said predetermined program,
wherein the input processing performed by said third input means is so executed that the structural component contained in said list of the structural components displayed by said display means is added or alternatively the structural component already selected is deleted from said list of the structural components in response to the information inputted through said second input means, to thereby alter the structural components of the generated program while inputting designatively the linking relation relevant to the altered structural components.

11. A program generating apparatus according to claim 9, said third input means including second decision means for making decision as to permissibility of contents of the inputted alteration information on the basis of the linking constraints imposed on the structural components as acquired through said first acquisition means upon inputting of the information for altering said generated program,
wherein a predetermined input processing is executed on the basis of result of the decision made by said second decision means.

12. A program generating apparatus according to claim 9, wherein the input processing executed by said third input means is realized by editing directly the source codes for said generated program.

13. A program generating apparatus according to claim 9, wherein said third input means is so designed as to perform both a first input processing which is so executed that the structural component contained in said list of the structural components displayed by said display means is added or alternatively the structural component already selected is deleted by inputting a command for altering the structural components of said generated program while inputting designatively the linking relation for the structural components to be altered and a second input processing executed by editing directly the source codes for said generated program, and
wherein said second generating means regenerates said predetermined program by merging the input contents resulting from said first and second input processings.

14. A program generating apparatus according to claim 1, further comprising:
guideline displaying means for displaying a guideline for the input processing executed by said first input means or alternatively by said second input means or alternatively by said third input means.

15. A program generating apparatus according to claim 2, further comprising:
processing scheme registering means for adding or alternatively deleting or alternatively editing the processing scheme for a list of said processing schemes.

16. A program generating apparatus according to claim 1, further comprising:
structural components registering mean provided for said predetermined storage for adding or alternatively deleting or alternatively editing the information concerning the utilizable structural components for generating said predetermined program.

17. A program generating apparatus according to claim 1, wherein said predetermined program is a program destined for processing XML data.

18. A program generating method for generating a program destined for processing XML data, comprising:
a first step of inputting a desired processing scheme selected from a plurality of processing schemes to process XML data;
a second step of acquiring information from a predetermined storage, the information concerning utilizable plural structural components for generating a predetermined program on the basis of the processing scheme inputted in said first step, said predetermined program being generated by linking said structural components;
a third step of displaying at least a part of the information acquired in said second step;
a fourth step of selectively inputting the information concerning the plural structural components for generating said predetermined program on the basis of the part of the information displayed in said third step; and
a fifth step of generating said predetermined program by linking the plural structural components on the basis of the information concerning the plural structural components inputted in said fourth step while ensuring internal consistency of said predetermined program by using linking constraints.

19. A program for generating program stored in a storage medium readable by a computer for allowing said computer to execute a processing of generating a predetermined program for generating a program destined for processing XML data, wherein said program generating program causes said computer to execute:
a first step of inputting a desired processing scheme selected from a plurality of processing schemes to process XML data;
a second step of acquiring information from a predetermined storage, the information concerning utilizable plural structural components for generating a predetermined program on the basis of the processing scheme inputted in said first step, said predetermined program being generated by linking said structural components;
a third step of displaying at least a pad of the information acquired in said second step;
a fourth step of selectively inputting the information concerning the plural structural components for generating said predetermined program on the basis of the pad of the information displayed in said third step; and
a fifth step of generating said predetermined program by linking the plural structural components on the basis of the information concerning the plural structural components inputted in said fourth step while ensuing interal consistency of said predetermined program by using linking constraints.

* * * * *

UNITED STATES PATENT AND TRADEMARK OFFICE
CERTIFICATE OF CORRECTION

PATENT NO. : 7,308,677 B2  Page 1 of 1
APPLICATION NO. : 10/355283
DATED : December 11, 2007
INVENTOR(S) : Tadahiro Uehara et al.

It is certified that error appears in the above-identified patent and that said Letters Patent is hereby corrected as shown below:

First Page, Column 1 (U.S. Patent Documents), Line 7, change "Pananikolaou et al." to --Papanikolaou et al.--.

Column 18, Line 3, change "mean" to --means--.

Column 18, Line 49, change "pad" to --part--.

Column 18, Line 54, change "pad" to --part--.

Column 18, Line 59, change "interal" to --internal--.

Signed and Sealed this

Tenth Day of June, 2008

JON W. DUDAS
*Director of the United States Patent and Trademark Office*